United States Patent
Johnsrud et al.

(10) Patent No.: US 10,636,033 B2
(45) Date of Patent: Apr. 28, 2020

(54) SYSTEM FOR ROUTING OF PROCESS AUTHORIZATIONS AND SETTLEMENT TO A USER IN A PROCESS DATA NETWORK

(71) Applicant: BANK OF AMERICA CORPORATION, Charlotte, NC (US)

(72) Inventors: Darrell Johnsrud, Camas, WA (US); Manu Jacob Kurian, Dallas, TX (US); Michael Wuehler, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 558 days.

(21) Appl. No.: 15/050,372

(22) Filed: Feb. 22, 2016

(65) Prior Publication Data

US 2017/0243217 A1    Aug. 24, 2017

(51) Int. Cl.
| | | |
|---|---|---|
| G06Q 40/00 | (2012.01) | |
| G06Q 20/40 | (2012.01) | |
| G06Q 20/38 | (2012.01) | |
| H04L 9/32  | (2006.01) | |

(52) U.S. Cl.
CPC ..... *G06Q 20/4014* (2013.01); *G06Q 20/3821* (2013.01); *G06Q 20/401* (2013.01); *H04L 9/3236* (2013.01); *G06Q 2220/00* (2013.01); *H04L 2209/38* (2013.01); *H04L 2209/56* (2013.01)

(58) Field of Classification Search
CPC .................................................. G06Q 40/00
USPC .......................................................... 705/44
See application file for complete search history.

(56) References Cited

U.S. PATENT DOCUMENTS

| 5,671,283 A | 9/1997 | Michener et al. |
| 5,835,599 A | 11/1998 | Buer |
| 6,073,234 A | 6/2000 | Kigo et al. |
| 6,324,286 B1 | 11/2001 | Lai et al. |

(Continued)

FOREIGN PATENT DOCUMENTS

| WO | WO 2014162296 | 10/2014 |
| WO | WO 2015135018 | 9/2015 |

OTHER PUBLICATIONS

Tasca. "Digital Currencies: Principles, Trends, Opportunities, and Risks." Trends, Opportunities, and Risks. Sep. 7, 2015 (Sep. 7, 2015); Retrieved from https://www.researchgate.net/profile/Paolo_Tasca/publication/290805276 Digital Currencies Principles Trends Opportunities and Risks/Links569bb91e)8ae6169e562552.pif, p. 1, 5, 10, 12, 14.

(Continued)

*Primary Examiner* — Ojo O Oyebisi
(74) *Attorney, Agent, or Firm* — Michael A. Springs; Peter B. Stewart; Moore & Van Allen PLLC

(57) ABSTRACT

Embodiments of the present invention are directed to routing process authorizations to determine an appropriate legal entity name when an alternate entity name is provided. The system stores alternate entity names in a private or semi-private block chain distributed network, where a block chain ledger keeps an ongoing record of the alternate entity names and their associated legal entity name. When an authorization request is received that does not include a known legal entity name, the system will match the listed entity name with one of the stored alternate entity names, and thereby determine the legal entity name that should be associated with the authorization request.

20 Claims, 7 Drawing Sheets

(56) References Cited

U.S. PATENT DOCUMENTS

| | | |
|---|---|---|
| 6,725,303 B1 | 4/2004 | Hoguta et al. |
| 6,850,252 B1 | 2/2005 | Hoffberg |
| 6,973,187 B2 | 12/2005 | Gligor et al. |
| 7,055,039 B2 | 5/2006 | Chavanne et al. |
| 7,092,400 B2 | 8/2006 | Malzahn |
| 7,184,549 B2 | 2/2007 | Sorimachi et al. |
| 7,362,859 B1 | 4/2008 | Robertson et al. |
| 7,392,384 B2 | 6/2008 | Hopkins et al. |
| 7,428,306 B2 | 9/2008 | Celikkan et al. |
| 7,502,933 B2 | 3/2009 | Jakobsson et al. |
| 7,574,401 B1 | 8/2009 | Burns |
| 7,649,992 B2 | 1/2010 | Raju et al. |
| 7,764,788 B2 | 7/2010 | Tardo |
| 7,979,889 B2 | 7/2011 | Gladstone et al. |
| 8,078,874 B2 | 12/2011 | You et al. |
| 8,107,621 B2 | 1/2012 | Celikkan et al. |
| 8,155,311 B2 | 4/2012 | Shin et al. |
| 8,259,934 B2 | 9/2012 | Karroumi et al. |
| 8,358,781 B2 | 1/2013 | Schneider |
| 8,397,841 B1 | 2/2013 | Taylor et al. |
| 8,396,209 B2 | 3/2013 | Schneider |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,635,000 B1 | 4/2017 | Muftic |
| 9,672,499 B2 | 6/2017 | Yang et al. |
| 2003/0126094 A1 | 7/2003 | Fisher et al. |
| 2004/0172535 A1 | 9/2004 | Jakobsson et al. |
| 2004/0199463 A1 | 10/2004 | Deggendorf |
| 2005/0256802 A1 | 11/2005 | Ammermann et al. |
| 2008/0301043 A1 | 12/2008 | Unbehagen |
| 2009/0281948 A1 | 11/2009 | Carlson |
| 2010/0279653 A1 | 11/2010 | Poltorak |
| 2011/0078073 A1 | 3/2011 | Annappindi |
| 2011/0197064 A1 | 8/2011 | Garcia Morchon et al. |
| 2012/0066121 A1 | 3/2012 | Shahbazi et al. |
| 2012/0284175 A1 | 11/2012 | Wilson et al. |
| 2013/0198061 A1 | 8/2013 | Cheer et al. |
| 2013/0232056 A1 | 9/2013 | Schulman |
| 2013/0311375 A1 | 11/2013 | Priebatsch |
| 2014/0006185 A1 | 1/2014 | Zurn et al. |
| 2014/0040114 A1 | 2/2014 | Baumgart et al. |
| 2014/0089243 A1 | 3/2014 | Oppenheimer |
| 2014/0310171 A1 | 10/2014 | Grossman et al. |
| 2015/0052587 A1 | 2/2015 | O'Neill et al. |
| 2015/0172053 A1 | 6/2015 | Schwarz et al. |
| 2015/0206106 A1 | 7/2015 | Yago |
| 2015/0262137 A1 | 9/2015 | Armstrong |
| 2015/0332283 A1 | 11/2015 | Witchey |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1 | 1/2016 | Spanos et al. |
| 2016/0050203 A1 | 2/2016 | Hefetz |
| 2016/0092874 A1 | 3/2016 | O'Regan et al. |
| 2016/0125376 A1 | 5/2016 | Beatty et al. |
| 2016/0125414 A1 | 5/2016 | Desai et al. |
| 2016/0191243 A1 | 6/2016 | Manning |
| 2016/0275461 A1 | 9/2016 | Sprague et al. |
| 2016/0292672 A1 | 10/2016 | Fay et al. |
| 2016/0321654 A1 | 11/2016 | Lesavich et al. |
| 2016/0323109 A1 | 11/2016 | McCoy et al. |
| 2016/0342978 A1 | 11/2016 | Davis et al. |
| 2016/0342989 A1 | 11/2016 | Davis |
| 2016/0342994 A1 | 11/2016 | Davis |
| 2017/0005804 A1 | 1/2017 | Zinder |
| 2017/0011460 A1 | 1/2017 | Molinari et al. |
| 2017/0041296 A1* | 2/2017 | Ford ............... H04W 12/02 |
| 2017/0046526 A1 | 2/2017 | Chan et al. |
| 2017/0046651 A1 | 2/2017 | Lin et al. |
| 2017/0046664 A1 | 2/2017 | Haldenby et al. |
| 2017/0046680 A1 | 2/2017 | Crites |
| 2017/0046806 A1 | 2/2017 | Haldenby et al. |
| 2017/0091397 A1 | 3/2017 | Shah |
| 2017/0103167 A1 | 4/2017 | Shah |
| 2017/0103461 A1 | 4/2017 | Acuña-Rohter et al. |
| 2017/0109735 A1 | 4/2017 | Sheng et al. |
| 2017/0116693 A1 | 4/2017 | Rae et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0140375 A1 | 5/2017 | Kunstel |
| 2017/0163733 A1 | 6/2017 | Grefen et al. |
| 2017/0177855 A1 | 6/2017 | Costa Faidella et al. |
| 2017/0178131 A1 | 6/2017 | Fernandez et al. |
| 2017/0178237 A1 | 6/2017 | Wong |
| 2017/0180134 A1 | 6/2017 | King |
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0228822 A1 | 8/2017 | Creighton, IV et al. |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2018/0053161 A1 | 2/2018 | Bordash et al. |
| 2018/0268479 A1 | 9/2018 | Dowling et al. |

OTHER PUBLICATIONS

Lerner. "MAVEPAY, A New Lightweight Payment Scheme for Peer to Peer Currency Networks." Apr. 17, 2012 ((Apr. 17, 2012) Retrieved from <https://pdfs.semanticscholar.org/1185/a26f014678b959876519065e2624458d75b8.pdf>. Entire document.

PCT International Searching Authority; International Search Report and Written Opinion for PCT/US2016/061402 dated Dec. 27, 2016.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015, 6 pages.

PCT International Searching Authority; Written Opinion for PCT/IB16/01655 completed Mar. 11, 2017, 8 pages.

PCT International Searching Authority; International Search Report for PCT/IB16/01655 completed Mar. 12, 2017, 4 pages.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

(56) References Cited

OTHER PUBLICATIONS

Buterin, Vitalik, "On Public and Private Blockchains", Aug. 7, 2015, https://blog.ethereum.org/2015/08/07/on-public-and-private-blockchains/.

* cited by examiner

SYSTEM FOR ROUTING OF PROCESS AUTHORIZATIONS AND SETTLEMENT TO A USER IN A PROCESS DATA NETWORK

BACKGROUND

Many authorization systems require the use of an entity's legal name to grant an authorization request. However, sometimes better-known alias names, abbreviated names, and former names of the entity are used in an authorization request instead of the legal name of the entity. The use of such alternate entity names may be enough to grant the authorization request, if the authorization system is able to confidently and securely match the given alternate entity name with the legal name of the entity.

Distributed block chain networks can be an efficient and reliable mode of recording information, such as legal and alternate names of an entity. A block chain allows users to permanently record alternate names and new legal names (e.g., as the entity restructures or acquires other businesses) in a block chain that is associated with a legal name of the entity.

For these reasons and others, there is a need for improved processing of authorization requests by using a distributed block chain network.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a block chain distributed network for routing process authorizations in a process data network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve establishing a dedicated block chain network comprising a block chain ledger that records payment end points associated with a legal name of a merchant and one or more alternate merchant names from blocks on a block chain. Additionally, the system may receive a transaction request comprising transaction information associated with a new transaction, wherein the transaction information comprises a payment end point associated with an alternate merchant name of the one or more alternate merchant names that is not the legal merchant name. The system may then identify the alternate merchant name on the block chain ledger and determine, based on the block chain ledger, the legal name of the merchant associated with the transaction request. Furthermore, the system may adjust the payment end point of the transaction information to replace the identified alternate merchant name with the legal name of the merchant. In some embodiments, the system authorizes the transaction request.

In some embodiments of the system, each of the one or more alternate merchant names comprise an alias or a trade name of the merchant. Additionally or alternatively, in some embodiments of the system, each of the one or more alternate merchant names comprise a former legal name of the merchant, a former trade name of the merchant, a pre-acquisition name for at least a portion of the merchant, or a different merchant name associated with a different merchant that has since divested its payment rights to the merchant.

Additionally, in the system may also comprise steps of determining that the legal name of the merchant has been changed to a new legal name, and storing the new legal name on a block in the block chain.

In some embodiments, the system transfers funds associated with the transaction request from an account of a payer associated with the transaction request to an account of the legal name of the merchant.

Finally, in some embodiments, the system may transmit a confirmation request to a computing device of a payee of the new transaction, wherein the confirmation request comprises an indication that the alternate merchant name will be changed to the determined legal name of the merchant. The system may then receive, from the computing device of the payee, an acceptance of the confirmation request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
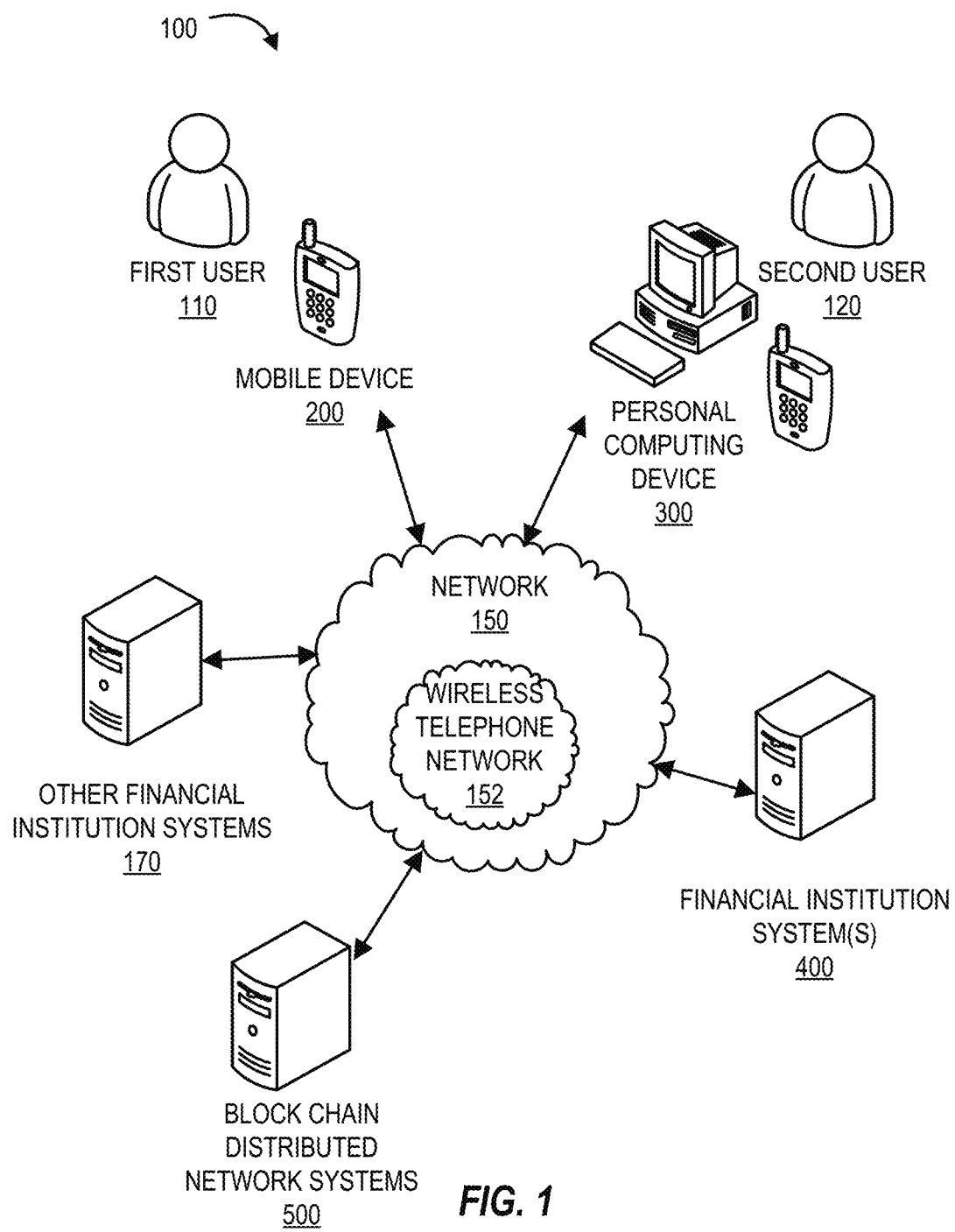
Figure 2:
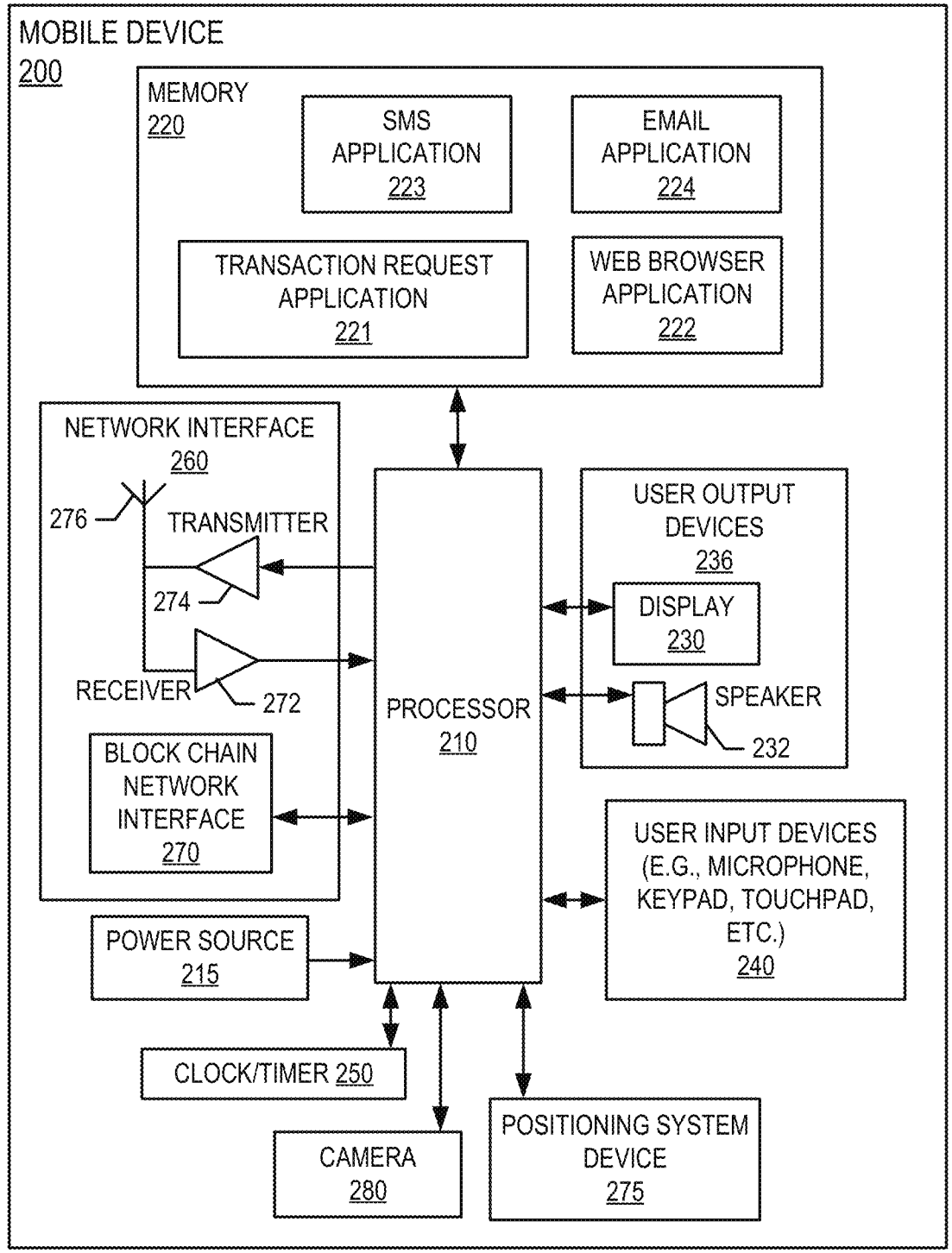
Figure 3:
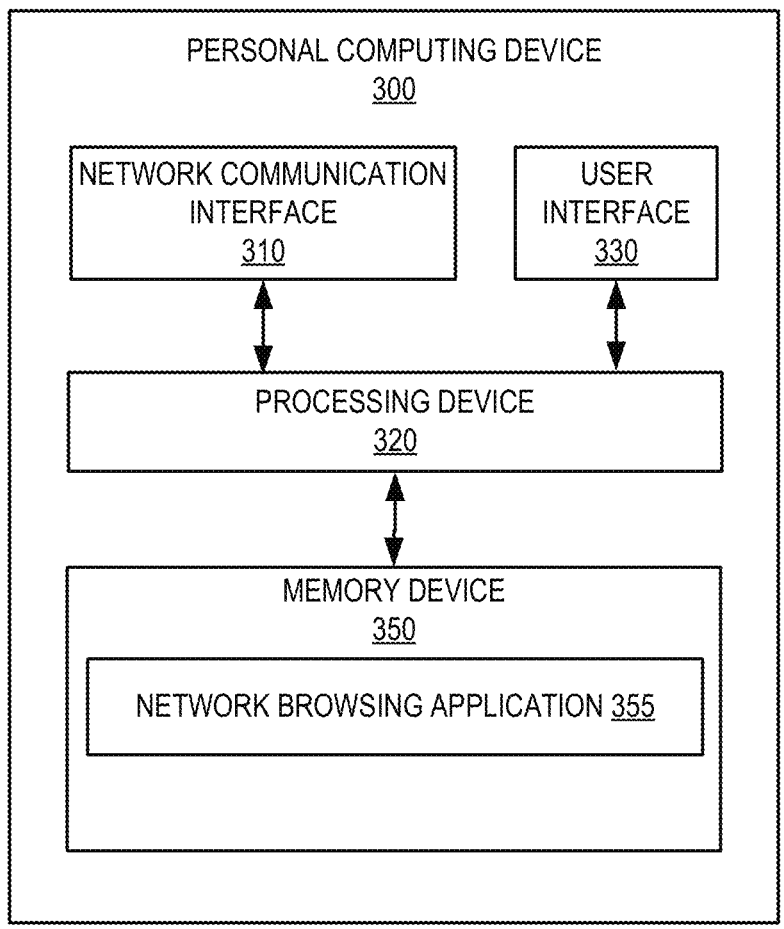
Figure 4:
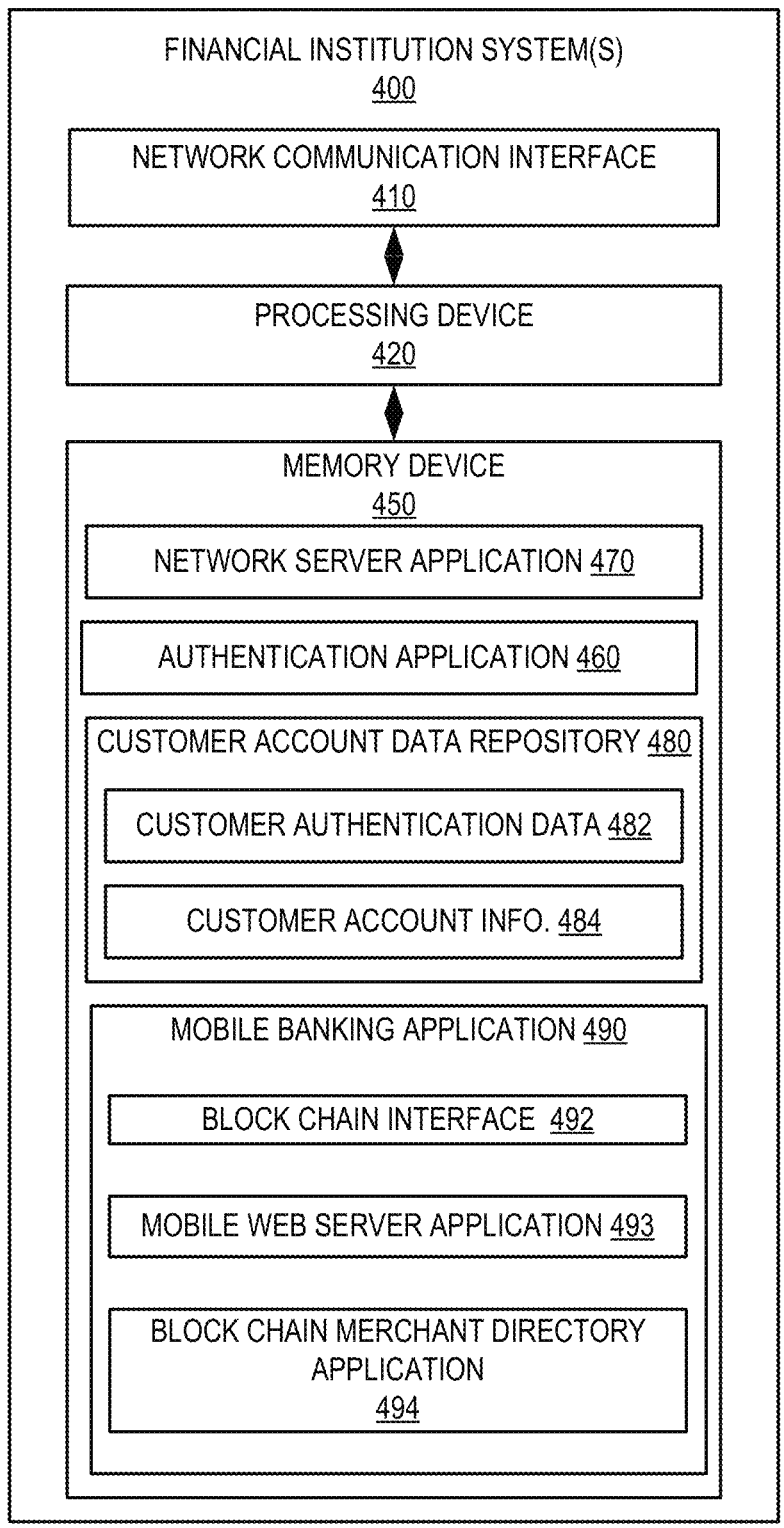
Figure 5:
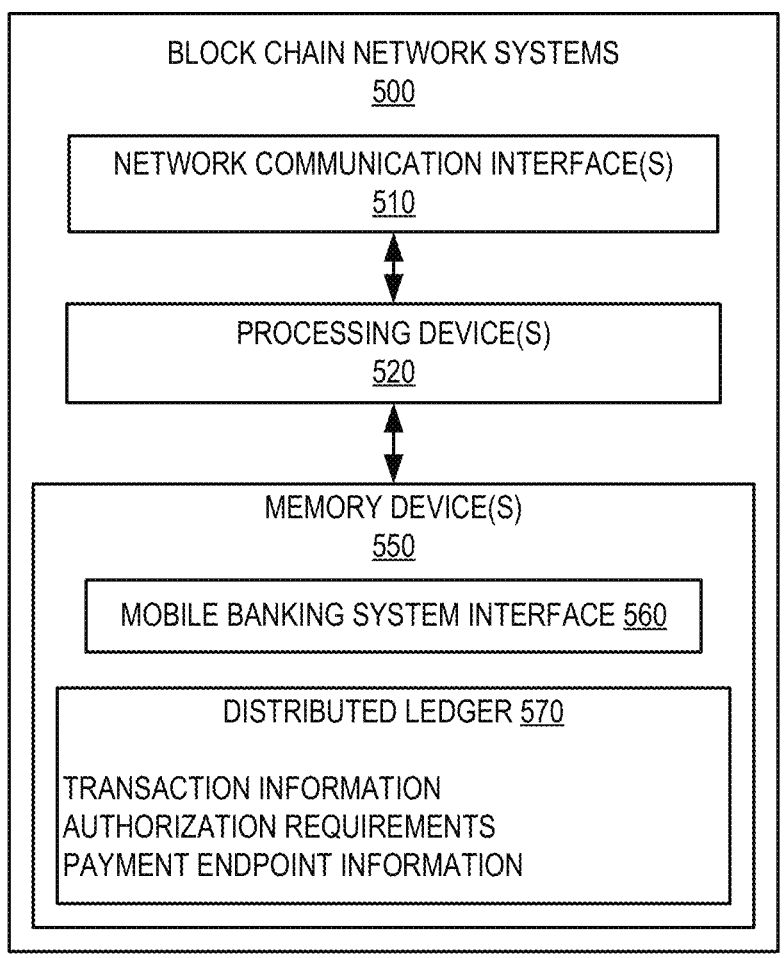
Figure 6A:
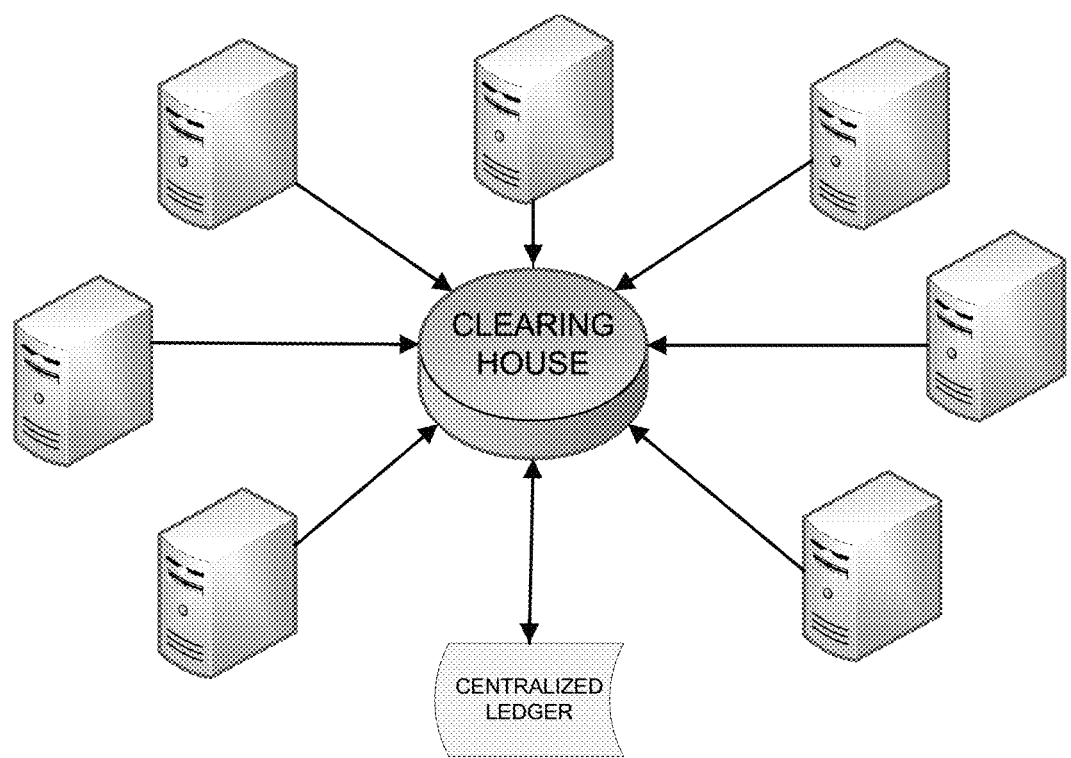
Figure 6B:
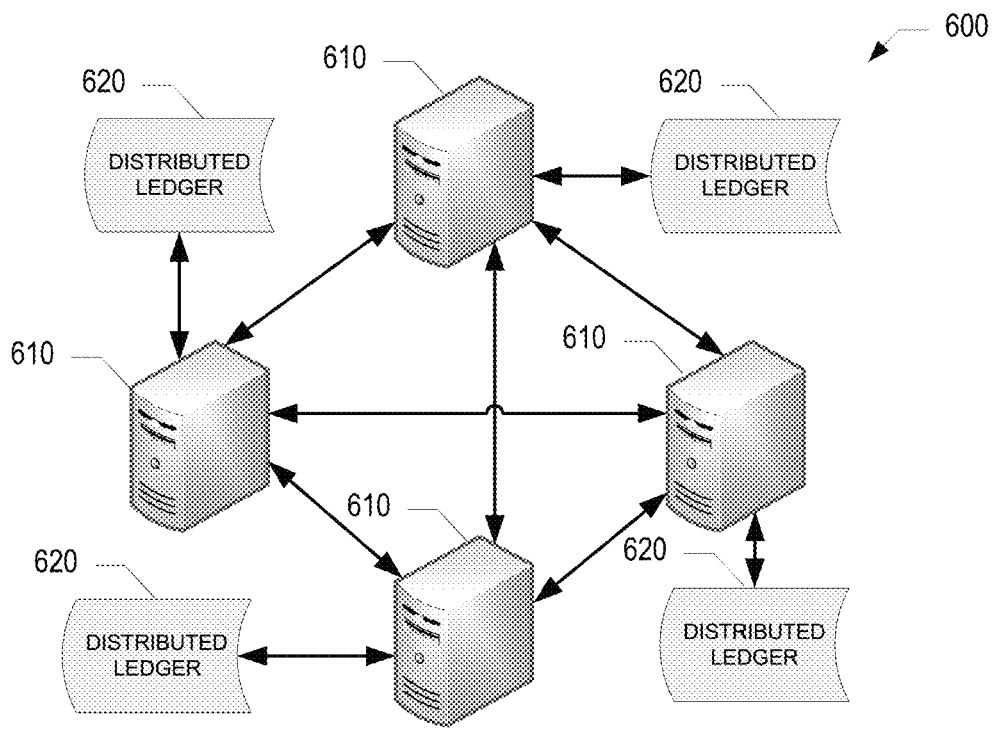
Figure 7:
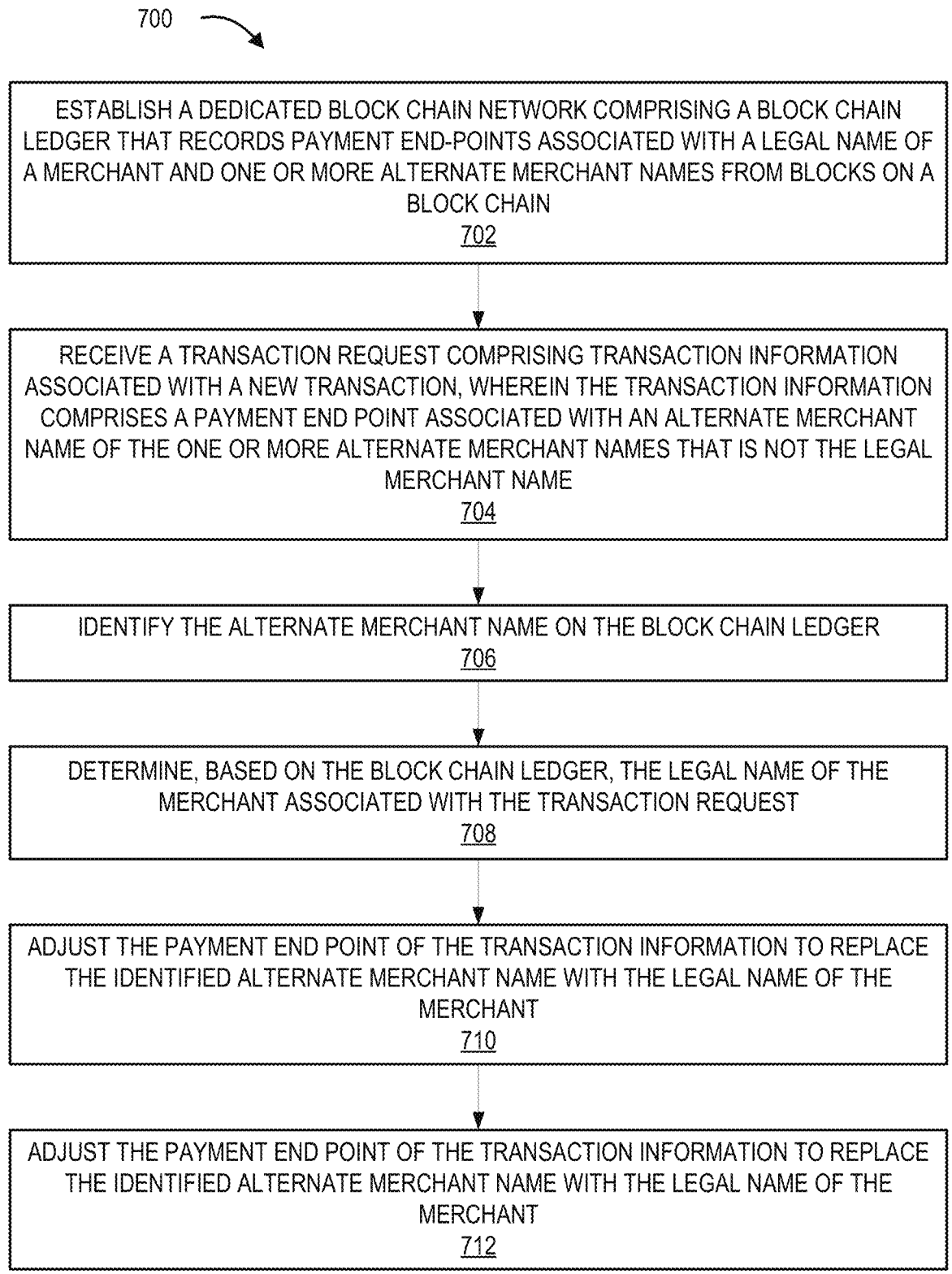

Having thus described embodiments of the invention in general terms, reference will now be made the accompanying drawings, wherein:

FIG. 1 provides a block diagram illustrating a block chain system and environment, in accordance with an embodiment of the invention;

FIG. 2 provides a block diagram illustrating the first user's mobile computing device of FIG. 1, in accordance with an embodiment of the invention;

FIG. 3 provides a block diagram illustrating the second user's personal computing device of FIG. 1, in accordance with an embodiment of the invention;

FIG. 4 provides a block diagram illustrating the financial institution's mobile banking system of FIG. 1, in accordance with an embodiment of the invention;

FIG. 5 provides a block diagram illustrating the block chain network systems of FIG. 1, in accordance with an embodiment of the invention;

FIG. 6A is a diagram illustrating a centralized clearinghouse network configuration, in accordance with embodiments of the invention;

FIG. 6B is a diagram illustrating a decentralized block chain network configuration, in accordance with embodiments of the invention; and FIG. 7 is a flowchart illustrating a process for routing process authorizations to a user, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention are directed to routing process authorizations to determine an appropriate legal entity name when an alternate entity name is provided. The system stores alternate entity names in a private or semi-private block chain distributed network, where a block chain ledger keeps an ongoing record of the alternate entity names and their associated legal entity name. When an authorization request is received that does not include a known legal entity name, the system will match the listed entity name with one of the stored alternate entity names, and thereby determine the legal entity name that should be associated with the authorization request.

In some embodiments, the entity is a merchant, and the authorization request is a transaction request that is received by a financial institution. In such embodiments, the system may receive the transaction request and identify an alternate merchant name as the indicated payee from the payment end point of the transaction request. The system then matches the received alternate merchant name with a known legal name of the merchant, so the transaction request can be redirected to the appropriate legal entity of the payee. In this way, the system can securely redirect transaction requests that do not include a known legal name of a merchant (e.g., they include a trade name, an alias, a former merchant name, and the like) to the appropriate legal name of the merchant.

FIG. 1 provides a block diagram illustrating a block chain system and environment 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the block chain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device 200 may be configured so that it can be used as an interface for interacting with the block chain for inputting information about one or more transactions. For example, the mobile device may 200 wirelessly communicate encrypted activity information to a terminal of the network 150 or the block chain systems 500.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a transaction request application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to enroll in the block chain program, the first user 110 downloads, is assigned, or otherwise obtains the transaction request application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the transaction request application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, and the like.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system(s) 400 and/or the block chain systems 500 (shown in FIG. 1) for the purpose of routing authorization requests and payments to a financial account associated with the legal name of a merchant instead of the provided alternate name, in accordance with embodiments of the invention.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a block chain merchant directory application 494, and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s) 400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a mobile banking system interface 560 and a distributed ledger 570. In some embodiments, the distributed ledger 570 stores data including, but not limited to, transaction information (e.g., price information, transacting parties, time and date of transaction, products associated with the transaction, interested parties to the transaction, description of the goods or services of the transaction, and the like), authorization requirements for interacting with the transaction data, block chain network rules or requirements, block miner information, payment end point information (e.g., payee name), authentication information, and the like. In one embodiment of the invention, both the mobile banking system interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Block Chain Configuration/Architecture

Rather than utilizing a centralized database of transaction information as discussed with reference to some embodiments above and as shown in FIG. 6A, other various embodiments of the invention may use a decentralized block chain configuration or architecture as shown in FIG. 6B in order to facilitate a centralized merchant directory application in a block chain distributed network or a tiered dedicated block chains network. Such a decentralized block chain configuration ensures accurate mapping transaction data to financial institutions, merchants, third parties, and/or customers. Accordingly, a block chain configuration may be used to maintain an accurate ledger of alternate merchant names and the current legal name of a merchant.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria. In some block chain systems, miners are incentivized to create blocks by a rewards structure that offers a pre-defined per-block reward and/or payments offered within the transactions validated themselves. Thus, when a miner successfully validates a transaction on the block chain, the miner may receive rewards and/or payments as an incentive to continue creating new blocks.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains have been developed. These include distributed domain name management, decentralized crowd-funding, synchronous/asynchronous communication, decentralized real-time ride sharing and even a general purpose deployment of decentralized applications.

Routing Process Authorizations and Settlements to a User

Turning now to FIG. 7, a flowchart is provided to illustrate a process 700 for routing process authorizations to a user, in accordance with embodiments of the invention. The process 700 may begin as shown in block 702 where the system establishes a dedicated block chain network comprising at least one block chain ledger that records payment end points associated with a legal name of a merchant and one or more alternate merchant names from blocks on at least one block chain.

The block chain network may be a block chain network like the ones described in reference to FIG. 6B. Additionally, the block chain network may be a private network, where only authorized and validated individuals and/or entities may have access to one or more nodes of the block chain. Alternatively, the block chain network may be a hybrid network where a certain number or percentage of nodes in the block chain network must by managed by an authorized individual or entity. The private or hybrid models of the block chain network allow for the necessary security of potentially sensitive information that may be generated in a block of a block chain and recorded on a ledger of the block chain. In some embodiments, the block chain network may only be accessible by one or more financial institutions whose ordinary business includes the processing of payment requests. In some embodiments, one or more merchants associated with a financial institution may have access to the block chain network. For example, a merchant with a financial account at a financial institution that manages the block chain network may have read and write access to a node and associated block chain that stores information related to the merchant and/or its transactions.

Each node of the block chain network may have its own ledger, and each ledger may be checked against the others in the block chain network to provide an accurate representation of the recorded information in the block chain. As the system receives payment end points, the system may store information associated with the payment end points in its own block of a node's block chain network, and the associated ledger will then record the information along with time stamp information. When a new payment end point is stored in the block chain, the ledger is updated to include the new payment end point information while maintaining a time-stamped record of previous payment end point information.

As stated in block 702, the payment end point information may comprise naming information for a merchant of the transaction. For example, the payment end point may indicate that a certain merchant entity is to be paid a transaction amount from a customer's financial account. The merchant entity may be identified in the payment end point information as the legal name of the merchant. This legal name of the merchant may be the name stored in the Secretary of State's database of incorporated entities, the name on record as the owner of a financial account, the name on the merchant's legal documents (e.g., articles of incorporation, bylaws, legal motions, and the like), or any other name that indicates that actual entity that is receiving the payment.

However, in some transactions, the payer may not know what the legal name of the entity is, may use a trade name or abbreviation name of the merchant, or use an outdated name of the merchant when attempting to make a payment. In such cases, the payer may attempt to make a payment to an alternate name of the merchant. These payments to an alternate name of the merchant may still be valid, but the system must determine the actual legal recipient of the transfer funds before the transaction request can be authorized.

Examples of alternate names include, but are not limited to, trade names of the merchant, aliases of the merchant, identifying codes of the merchant, abbreviations of a merchant's legal name or trade name, common or expected misspellings of a merchant's name, employees or other individuals acting on the merchant's behalf (e.g., payments made to a shop keeper instead of the shop keeper's business), and the like. Alternate merchant names may also include former legal names of the merchant, former trade names of the merchant, common or expected misspellings of the former legal or trade names of the merchant, and the like.

Of course, a merchant, as a business entity, may reorganize, restructure, acquire another company, be acquired by another company, merge with another company, acquire rights to payment from another company, and the like. Therefore, in some embodiments, alternate merchant names may include pre-reorganization names of the merchant, pre-acquisition names for at least a portion of the merchant (e.g., names of a company that has now been acquired by the merchant, and that was the appropriate payee for certain transactions prior to the acquisition), or a different merchant name that is associated with a different company that has since divested its payment rights to the merchant.

One or more of the financial institutions with access to the block chain may update blocks of the block chain network to record current and alternate names of the merchant, where each alternate name is in a block chain associated with the current legal name of the merchant. Additionally or alternatively, a merchant may perform the same recording and updating steps to associate each known alternate name with the current legal name of the merchant. This allows a financial institution or a merchant to update the merchant's legal name in the event the merchant has been renamed or restructured. The merchant may send a notification to the financial institution indicating that the merchant has been acquired by a different merchant, and therefore has a new legal name. The financial institution may then generate a new block on a block chain dedicated to the merchant to indicate the new legal name of the merchant.

As such, an ongoing record of alternate names for the merchant that can be matched with the current legal name of the merchant can be kept on a block chain of the block chain network. In some embodiments, multiple merchants may be associated with a single block chain network. For example, each merchant could be associated with one or more nodes in the block chain such that the block chains of each respective one or more nodes lists the alternate names associated with its respective legal merchant name. In such embodiments, authentication and/or security measures may be put in place to allow each merchant to only access and/or generate blocks on specific nodes dedicated to that merchant. Therefore, one merchant's alternate names and other payment end point information is protected from the view of or manipulation by another merchant.

While the process 700 describes how an alternate merchant name can be replaced with the current legal merchant name on a payment end point, it should be known that the system can be configured to additionally or alternatively track account information for one or more merchants. In this way, the system can maintain records of alternative financial account names and/or numbers for one or more merchants as they change over time. Therefore, in later steps, an ongoing record of alternate account names and/or numbers can be matched with the current, appropriate account name and number. Accounts can change based on a merchant changing financial institutions, changing account types, changing payment plans, being acquired by another merchant with a different account setup, splitting a single account into multiple smaller accounts, aggregating commonly held accounts, acquiring a different merchant with a different set of accounts. Additionally, account information can change based on judicial orders, notices of change, the selling of periodic payment assets to a different merchant with a different account setup, and the like. By maintaining a continuous linked block chain record of the former and alternative accounts of one or more merchants, the system can easily handle changes in payment streams when payers continue to write out payments to non-current account names and/or account numbers.

Maintaining ongoing records of legal merchant names, alternative merchant names, appropriate account numbers or names, and alternate account numbers and names in a block chain structure allows the financial institutions and/or the merchants to manage the payment end point information for a merchant in a linked structure. This linked structure allows the merchant and/or the financial institution to easily add on an additional block chain in the event of a merger of merchants and/or accounts. The linked structure also allows the merchant and/or the financial institution to split the block chain if the merchant is divesting accounts, or is reorganizing to have a different set of legal and/or alternative names and accounts.

In embodiments where the system is tracking account information the linked structure of the block chains on the block chain network allow the system to easily handle an event like a notice of change, where a payee of a periodic payment is changed without automatic notice to the financial institution and/or the user. The merchant can update the block chain system with the new appropriate account name and number, and does not have to immediately require the payer to include the new account number because the old account number will be associated with the new appropriate account name and number on the updated block chain.

In some embodiments, the process may include block 704, where the system receives a transaction request comprising transaction information associated with a new transaction, wherein the transaction information comprises a payment end point associated with an alternate merchant name of the one or more alternate merchant names that is not the legal merchant name. In some embodiments, the system is operated by a financial institution or other entity capable of processing payment requests between a customer and a merchant. The transaction request may be in the form of an electronic request, a check, a cashier's check, a money order, and any other request for the financial institution to process a payment. The transaction request includes a payment end point, which at least indicates the intended payee (e.g., the merchant) for the transaction request.

As stated above, the payer does not always put the appropriate legal name of the merchant down as the payee when these transaction requests are made. Instead, as is the case for this process 700, the payer places an alternate merchant name (e.g., alias, former name, individual representative of the merchant, and the like) down as the payee. Additionally or alternatively, the payer may put down the incorrect account name and/or number (or other account identifier) when the transaction request is made. In such cases, the payer may put down an alternate account name or number (e.g., an old account, a common misspelling or mistyping of the account name or number, an account that has been superseded by a notice of change, and the like.) instead of the appropriate, current, account of the legal entity.

As stated in block 706, the process 700 may include a step where the system identifies the alternate merchant name on the block chain ledger. Once the system has identified that the payee name (i.e., the alternate name) from the payment end point information is not a known legal name of a merchant client, the system can analyze the payee name against the recorded alternate names of the block chain ledger. The system may search a single, centralized merchant directory to determine if the payee name matches an alternate name from the ledger. Additionally, the system may search multiple merchant-based block chain networks, or multiple block chain networks associated with a small group of merchants, to determine whether the received payee name matches an alternate merchant name.

Similarly, in embodiments where the account number or name is being identified, the system may match the payee account with one or more of the alternate account numbers or names that are stored in the account information block chain.

Once the payee name is matched with an alternate merchant name, the process 700 may progress to block 708, where the system determines, based on the block chain ledger, the legal name of the merchant associated with the transaction request. Since one or more ledgers record the progression of alternate merchant names and the legal name of the merchant, the system can use the ledger to track the identified alternate merchant name back to the appropriate legal name of the merchant. In embodiments where each merchant has its own block chain network, the system can determine that any alternate merchant name identified within a merchant's individual block chain network is associated with the legal name of the merchant.

Similarly, the system may determine, based on the block chain ledger, the appropriate name or number of the account associated with the transaction request. For example, when the system identifies an account that, according to the block chain network, has recently been subject to a notice of change, the system can determine that the appropriate merchant name and/or account number is the most recent account on the block chain of account changes. In this way, the system can determine which account the funds are actually supposed to be directed to, without having to reject the transaction request or requesting additional information from the payer or payee.

With the appropriate legal name of the merchant identified, the system, as shown in block 710, can adjust the payment end point of the transaction information to replace the identified alternate merchant name with the legal name of the merchant. In some embodiments, the system removes the alternate merchant name and inserts the legal name of the merchant. Alternatively, the system may replace the entire payment end point with a new payment end point that includes the appropriate legal name of the merchant.

In embodiments where the account number or name is being replaced by the current or appropriate account number or name, the system can adjust the payment end point of the transaction information to replace the identified alternate account number or name with the legal or current account name or number of the merchant. In some embodiments, the system removes the alternate account number and inserts the identified appropriate account number. Alternatively, the system may replace the entire payment end point with a new payment end point that includes the identified appropriate account number or name for the merchant.

In embodiments with multiple appropriate merchants and/or accounts, the system may add each of the multiple appropriate merchant names and/or accounts to the payment end points. Alternatively, the system may generate new payment end points with proportioned funds being directed to their respective appropriate legal merchant and/or appropriate account.

Finally, in some embodiments, the process 700 includes block 712, where the system authorizes the transaction request. By replacing the alternate merchant name that was improperly provided by the payer with the appropriate legal name of the merchant, the system puts the payment end point, and therefore the transaction request, in condition for acceptance. The secure nature of a block chain network allows the financial institution to trust the authenticity and accuracy of the pairing between the alternate merchant name and its respective legal name of the merchant. Therefore, the system can trust, to a reasonable degree of certainty, that the legal name of the merchant is the intended recipient of the transaction request.

In some embodiments, the system may request a confirmation from the payer of the transaction request. The system may establish an electronic communication channel with a computing device (e.g., a mobile device) of the payer, and prompt a user interface of the computing device to display a request for confirmation of the name change. Such a confirmation request may describe the change from the alternate merchant name currently associated with the payment end point to the legal name of the merchant. The system may also prompt the user interface of the computing device of the payer to provide selectable answers like "accept" (or "confirmed"), "deny," or "enter a different merchant name." The payer may provide a response as input into the user interface of the computing device. If the response is an acceptance, then the system may proceed to authorize the transaction. However, if the response is not an acceptance, the system may decide not to authorize the name change and attempt to process the transaction with the alternate name of the merchant as the payee.

The system may also transfer the indicated funds associated with the transaction request from an account of a payer to an account of the legal name of the merchant. For example, if a financial institution operates the system, and the payer and the merchant both have financial accounts held at the financial institution, then the system may transfer the transaction funds from the payer's account to the merchant's account.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/942,326 now published as 2017/0140408 | TRANSPARENT SELF-MANAGING REWARDS PROGRAM USING BLOCKCHAIN AND SMART CONTRACTS | Nov. 16, 2015 |
| 15/041,555 now published as 2017/0132630 | BLOCK CHAIN ALIAS FOR PERSON-TO-PERSON PAYMENTS | Feb. 11, 2016 |

-continued

| U.S. patent application Ser. No. | Title | Filed On |
|---|---|---|
| 62/253,935 | BLOCK CHAIN ALIAS PERSON-TO-PERSON PAYMENT | Nov. 11, 2015 |
| 15/041,566 now published as 2017/0132615 | BLOCK CHAIN ALIAS PERSON-TO-PERSON PAYMENTS | Feb. 11, 2016 |
| 15/050,375 now published as 2017/0244757 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 15/050,379 now published as 2017/0243215 | SYSTEM FOR EXTERNAL SECURE ACCESS TO PROCESS DATA NETWORK | Feb. 22, 2016 |
| 15/050,358 now published as 2017/0244721 | SYSTEM FOR PROVIDING LEVELS OF SECURITY ACCESS TO A PROCESS DATA NETWORK | Feb. 22, 2016 |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 now published as 2017/0230353 | SYSTEM FOR CONTROL OF SECURE ACCESS AND COMMUNICATION WITH DIFFERENT PROCESS DATA NETWORKS WITH SEPARATE SECURITY FEATURES | Feb. 22, 2016 |
| 15/049,716 now published as 2017/0243208 | SYSTEM FOR CONTROL OF DEVICE IDENTITY AND USAGE IN A PROCESS DATA NETWORK | Feb. 22, 2016 |
| 15/049,777 now published as 2017/0244707 | SYSTEM FOR ESTABLISHING SECURE ACCESS FOR USERS IN A PROCESS DATA NETWORK | Feb. 22, 2016 |
| 15/049,835 now U.S. Pat. No. 10,026,118 | SYSTEM FOR ALLOWING EXTERNAL VALIDATION OF DATA IN A PROCESS DATA NETWORK | Feb. 22, 2016 |
| 15/050,094 now published as 217/0214699 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098 now published as 2017/0213221 | SYSTEM FOR TRACKING AND VALIDATION OF MULTIPLE INSTANCES OF AN ENTITY IN A PROCESS DATA NETWORK | Feb. 22, 2016 |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 now U.S. Pat. No. 9,825,931 | SYSTEM FOR TRACKING AND VALIDATION OF AN ENTITY IN A PROCESS DATA NETWORK | Feb. 22, 2016 |
| 62/287,298 | SYSTEM FOR TRACKING AND VALIDATION OF AN ENTITY IN A PROCESS DATA NETWORK | Jan. 26, 2016 |
| 15/050,285 now published as 2017/0243177 | SYSTEM FOR ROUTING OF PROCESS AUTHORIZATION AND SETTLEMENT TO A USER IN PROCESS DATA NETWORK BASED ON SPECIFIED PARAMETERS | Feb. 22, 2016 |
| 15/050,292 now published under 2017/0243209 | SYSTEM FOR GRANT OF USER ACCESS AND DATA USAGE IN A PROCESS DATA NETWORK | Feb. 22, 2016 |
| 15/050,294 now published as 2017/0243212 | SYSTEM FOR IMPLEMENTING A DISTRIBUTED LEDGER ACROSS MULTIPLE NETWORK NODES | Feb. 22, 2016 |
| 15/049,852 now published as 2017/0244720 | SYSTEM FOR EXTERNAL VALIDATION OF PRIVATE-TO-PUBLIC TRANSITION PROTOCOLS | Feb. 22, 2016 |
| 15/049,852 now published as 2017/0243025 | SYSTEM FOR EXTERNAL VALIDATION OF DISTRIBUTED RESOURCE STATUS | Feb. 22, 2016 |
| 15/050,316 now published as 2017/0243214 | SYSTEM FOR TRACKING TRANSFER OF RESOURCES IN A PROCESS DATA NETWORK | Feb. 22, 2016 |
| 15/050,321 now published as 2017/0243287 | SYSTEM FOR MANAGING SERIALIZABILITY OF RESOURCE TRANSFERS IN A PROCESS DATA NETWORK | Feb. 22, 2016 |
| 15/050,307 now published as 2017/0243213 | SYSTEM TO ENABLE CONTACTLESS ACCESS TO A TRANSACTION TERMINAL USING A PROCESS DATA NETWORK | Feb. 22, 2016 |

The invention claimed is:

1. A system operatively connected with a block chain distributed network for routing process authorizations and transaction settlements in a process data network, the system comprising:
  a memory device;
  a processing device operatively coupled to the memory device, wherein the processing device is configured to execute computer-readable program code to:
    establish a block chain distributed network comprising a distributed block chain ledger that records process authorization end point associated with a legal name of a merchant and one or more alternate merchant names associated with the legal name of the merchant;
    receive a new authorization request comprising authorization information, wherein the authorization information comprises a process authorization end point associated with a merchant name that is not the legal name of the merchant;

access the distributed block chain ledger, wherein the distributed block chain ledger is updated based on communications from the block chain distributed network;

determine, using the distributed block chain ledger, that a first merchant name of the received new authentication request matches an alternate merchant name of the one or more alternate merchant names associated with the legal name of the merchant;

determine, using the distributed block chain ledger, that the merchant is authorized for the authorization request based on the determination that the first merchant name is associated with the legal name of the merchant;

adjust the process authorization end point of the authorization information to replace the first merchant name with the legal name of the merchant;

in response to determining that the merchant is authorized for the authorization request, transmit a notification to one or more validation nodes to validate the process authorization end point based on logic and rules for the block chain distributed network;

receive an input from the one or more validating nodes validating the process authorization end point;

in response to validating the process authorization end point, determine, using the distributed ledger, one or more transaction settlement preferences associated with the merchant;

determine, based on the transaction settlement preferences, a payment settlement route comprising a plurality of network payment rails operatively connected between the system and a merchant system; and route the transaction settlement according to the determined payment settlement route.

2. A system operatively connected with a block chain distributed network for routing process authorizations and transaction settlements in a process data network, the system comprising:

a memory device; and a processing device operatively coupled to the memory device, wherein the processing device is configured to execute computer-readable program code to:

establish a block chain distributed network comprising a distributed block chain ledger that records payment end point associated with a legal name of a merchant and one or more alternate merchant names associated with the legal name of the merchant;

receive a transaction request comprising transaction information associated with a new transaction, wherein the transaction information comprises a payment end point associated with a first merchant name that is not the legal name of the merchant;

access the distributed block chain ledger, wherein the distributed block chain ledger is updated based on communications from the block chain distributed network;

determine, using the distributed block chain ledger, that the first merchant name of the received transaction request matches an alternate merchant name of the one or more alternate merchant names associated with the legal name of the merchant;

determine, using the distributed block chain ledger, that the merchant is authorized to conduct the requested transaction based on the determination that the first merchant name is associated with the legal name of the merchant;

adjust the payment end point of the transaction information to replace the first merchant name with the legal name of the merchant;

in response to determining that the merchant is authorized for the authorization request, transmit a notification to one or more validation nodes to validate the payment end point based on logic and rules for the block chain distributed network;

receive an input from the one or more validating nodes validating the payment end point;

in response to validating the payment end point, determine, using the distributed ledger, one or more transaction settlement preferences associated with the merchant;

determine, based on the transaction settlement preferences, a payment settlement route comprising a plurality of network payment rails operatively connected between the system and a merchant system; and route the transaction settlement according to the determined payment settlement route.

3. The system of claim 2, wherein each of the one or more alternate merchant names comprise an alias or a trade name of the merchant.

4. The system of claim 2, wherein each of the one or more alternate merchant names comprise a former legal name of the merchant, a former trade name of the merchant, a pre-acquisition name for at least a portion of the merchant, or a different merchant name associated with a different merchant that has since divested its payment rights to the merchant.

5. The system of claim 2, wherein the processing device is further configured to execute computer-readable program code to:

determine that the legal name of the merchant has been changed to a new legal name; and store the new legal name on a block in the block chain.

6. The system of claim 2, wherein the processing device is further configured to execute computer-readable program code to transfer funds associated with the transaction request from an account of a payer associated with the transaction request to an account of the legal name of the merchant.

7. The system of claim 2, wherein the processing device is further configured to execute computer-readable program code to:

transmit a confirmation request to a computing device of a payee of the new transaction, wherein the confirmation request comprises an indication that the first merchant name will be changed to the determined legal name of the merchant; and receive, from the computing device of the payee, an acceptance of the confirmation request.

8. A computer program product for execution on a system operatively connected with a block chain distributed network and for using the block chain distributed network for routing process authorizations and transaction settlements in a process data network, the computer program product comprising at least one non-transitory computer readable medium comprising computer readable instructions, the instructions comprising instructions for:

establishing a block chain distributed network comprising a distributed block chain ledger that records payment end points associated with a legal name of a merchant and one or more alternate merchant names associated with the legal name of the merchant;

receiving a transaction request comprising transaction information associated with a new transaction, wherein the transaction information comprises a payment end point associated with a first merchant name that is not the legal name of the merchant;

accessing the distributed block chain ledger, wherein the distributed block chain ledger is updated based on communications from the block chain distributed network;

determining, using the distributed block chain ledger, that the first merchant name of the received transaction request matches an alternate merchant name of the one or more alternate merchant names associated with the legal name of the merchant;

determining, using the distributed block chain ledger, that the merchant is authorized to conduct the requested transaction in based on the determination that the first merchant name is associated with the legal name of the merchant;

adjusting the payment end point of the transaction information to replace the first merchant name with the legal name of the merchant;

in response to determining that the merchant is authorized for the authorization request, transmitting a notification to one or more validation nodes to validate the process authorization end point based on logic and rules for the block chain distributed network;

receiving an input from the one or more validating nodes validating the process authorization end point;

in response to validating the process authorization end point, determining, using the distributed ledger, one or more transaction settlement preferences associated with the merchant;

determining, based on the transaction settlement preferences, a payment settlement route comprising a plurality of network payment rails operatively connected between the system and a merchant system; and routing the transaction settlement according to the determined payment settlement route.

9. The computer program product of claim 8, wherein each of the one or more alternate merchant names comprise an alias or a trade name of the merchant.

10. The computer program product of claim 8, wherein each of the one or more alternate merchant names comprise a former legal name of the merchant, a former trade name of the merchant, a pre-acquisition name for at least a portion of the merchant, or a different merchant name associated with a different merchant that has since divested its payment rights to the merchant.

11. The computer program product of claim 8, wherein the computer readable instructions further comprise instructions for:

determining that the legal name of the merchant has been changed to a new legal name; and storing the new legal name on a block in the block chain.

12. The computer program product of claim 8, wherein the computer readable instructions further comprise instructions for transferring funds associated with the transaction request from an account of a payer associated with the transaction request to an account of the legal name of the merchant.

13. The computer program product of claim 8, wherein the computer readable instructions further comprise instructions for:

transmitting a confirmation request to a computing device of a payee of the new transaction, wherein the confirmation request comprises an indication that the first merchant name will be changed to the determined legal name of the merchant; and receiving, from the computing device of the payee, an acceptance of the confirmation request.

14. A computer implemented method for execution on a system operatively connected with a block chain distributed network and for using the block chain distributed network for routing process authorizations and transaction settlements in a process data network, said computer implemented method comprising:

providing a computing system comprising one or more computer processing devices and a non-transitory computer readable medium, where the computer readable medium comprises configured computer program instruction code, such that when said instruction code is operated by said one or more computer processing devices, said one or more computer processing devices perform the following operations:

establishing a block chain distributed network comprising a distributed block chain ledger that records payment end points associated with a legal name of a merchant and one or more alternate merchant names associated with the legal name of the merchant;

receiving a transaction request comprising transaction information associated with a new transaction, wherein the transaction information comprises a payment end point associated with a first merchant name that is not the legal name of the merchant;

accessing the distributed block chain ledger, wherein the distributed block chain ledger is updated based on communications from the block chain distributed network;

determining, using the distributed block chain ledger, that the first merchant name of the received transaction request matches an alternate merchant name of the one or more alternate merchant names associated with the legal name of the merchant;

determining, using the distributed block chain ledger, that the merchant is authorized to conduct the requested transaction based on the determination that the first merchant name is associated with the legal name of the merchant;

adjusting the payment end point of the transaction information to replace the first merchant name with the legal name of the merchant;

in response to determining that the merchant is authorized for the authorization request, transmit a notification to one or more validation nodes to validate the process authorization end point based on logic and rules for the block chain distributed network;

receive an input from the one or more validating nodes validating the process authorization end point;

in response to validating the process authorization end point, determine, using the distributed ledger, one or more transaction settlement preferences associated with the merchant;

determine, based on the transaction settlement preferences, a payment settlement route comprising a plurality of network payment rails operatively connected between the system and a merchant system; and route the transaction settlement according to the determined payment settlement route.

15. The computer implemented method of claim 14, wherein each of the one or more alternate merchant names comprise an alias or a trade name of the merchant.

16. The computer implemented method of claim 14, wherein each of the one or more alternate merchant names comprise a former legal name of the merchant, a former trade name of the merchant, a pre-acquisition name for at least a portion of the merchant, or a different merchant name associated with a different merchant that has since divested its payment rights to the merchant.

17. The computer implemented method of claim 14, wherein said configured computer program instruction code is further configured, such that when said instruction code is operated by said one or more computing processing devices, said one or more computer processing devices perform the following operations:

determining that the legal name of the merchant has been changed to a new legal name; and storing the new legal name on a block in the block chain.

18. The computer implemented method of claim 14, wherein said configured computer program instruction code is further configured, such that when said instruction code is operated by said one or more computing processing devices, said one or more computer processing devices perform the following operation:

transferring funds associated with the transaction request from an account of a payer associated with the transaction request to an account of the legal name of the merchant.

19. The computer implemented method of claim 14, wherein said configured computer program instruction code is further configured, such that when said instruction code is operated by said one or more computing processing devices, said one or more computer processing devices perform the following operations:

transmitting a confirmation request to a computing device of a payee of the new transaction, wherein the confirmation request comprises an indication that the first merchant name will be changed to the determined legal name of the merchant; and receiving, from the computing device of the payee, an acceptance of the confirmation request.

20. The system of claim 1, wherein each of the one or more alternate merchant names comprise an alias or a trade name of the merchant.

* * * * *